Sept. 10, 1929.  W. E. PRESCOTT ET AL  1,727,444
APPARATUS FOR TREATING CHOCOLATE
Filed Dec. 15, 1927  2 Sheets-Sheet 1
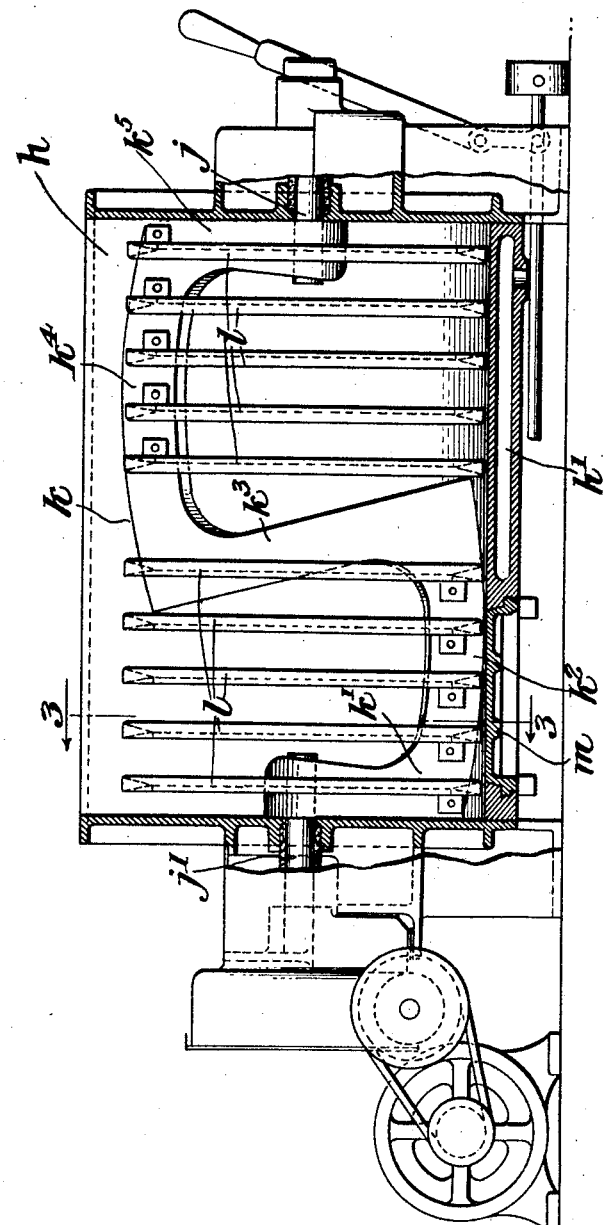
Inventors,
W. E. Prescott
and J. P. Bunce,
by their attorney Sept. 10, 1929. W. E. PRESCOTT ET AL 1,727,444
APPARATUS FOR TREATING CHOCOLATE
Filed Dec. 15, 1927 2 Sheets-Sheet 2
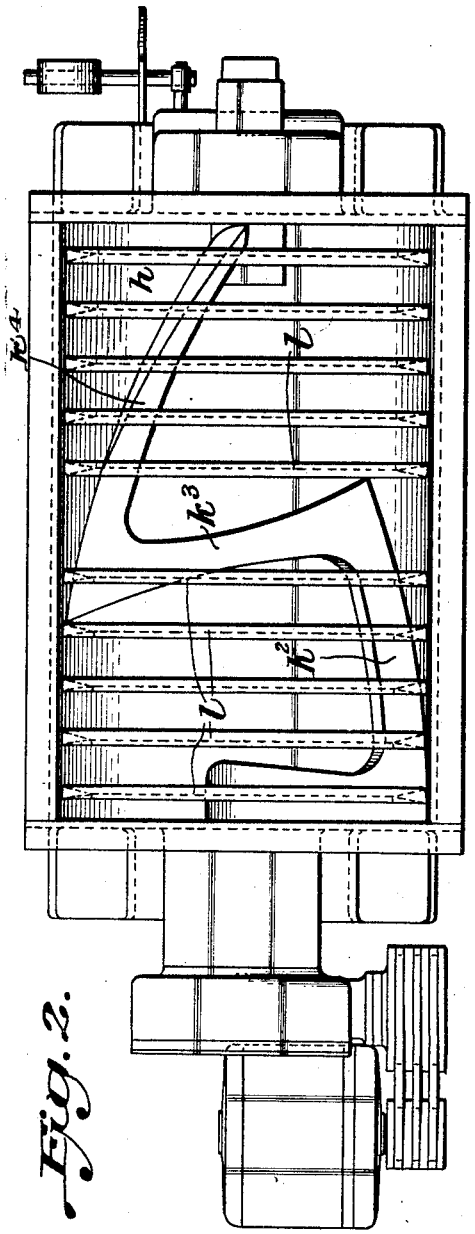
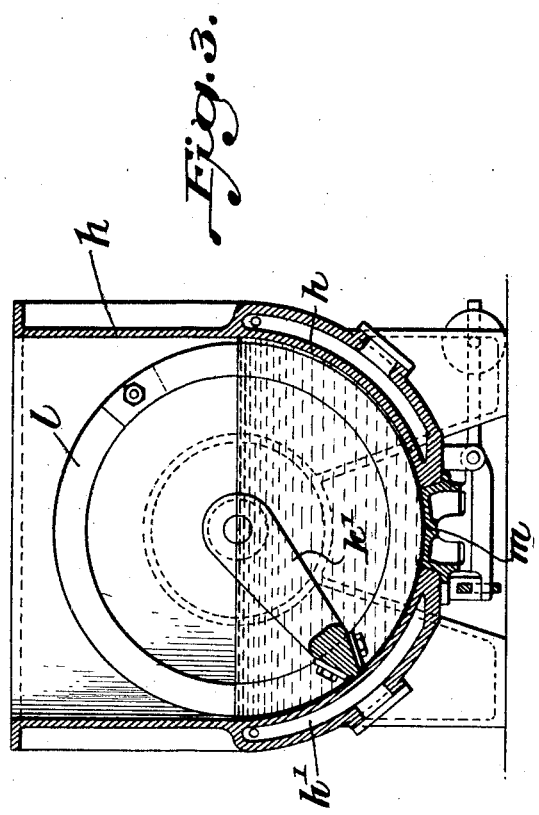
Inventors,
W. E. Prescott
and J. B. Bunce.
by their Attorney Patented Sept. 10, 1929.

1,727,444

UNITED STATES PATENT OFFICE.

WILLIAM EDWARD PRESCOTT AND JOHN PERCIVAL BUNCE, OF LONDON, ENGLAND, ASSIGNORS TO BAKER PERKINS CO. INC., OF SAGINAW, MICHIGAN, A CORPORATION OF NEW YORK.

APPARATUS FOR TREATING CHOCOLATE.

Application filed December 15, 1927, Serial No. 240,266, and in Great Britain December 17, 1926.

This invention relates to apparatus for the treatment of chocolate by the process known as "conching", in which process the chocolate is kept in continuous agitation for developing or improving the flavor thereof. This conching has hitherto been usually performed by means of a heavy roller immersed in the chocolate contained in a tank or "conch" and moved or swung to and fro the whole time the process is in operation so that the required agitation is secured together with a grinding effect. Such operation hitherto commonly occupied a period of at least 24 hours.

Our improved apparatus comprises broadly apparatus for treating chocolate by "conching" having a tank and a rotor mounted within said tank so that it is partly submerged in the chocolate, said rotor having blades so arranged with regard to the direction of rotary movement that they slide through the chocolate and act by surface friction to cause a rolling or sliding movement of the chocolate particles upon themselves.

According to our invention we employ a type of mixing machine comprising a semi-cylindrical jacketed tank preferably having its walls extended tangentially upwards above the level of the axis to a suitable height and having journalled in it a mixing blade comprising a radial arm near one end of the tank, a longitudinal portion extending about half way along the tank near the wall thereof, a substantially diametrical double arm at about the middle of the tank, another longitudinal portion extending from the central arm to near the other end of the tank and a radial arm at said other end. This mixing blade is therefore balanced and its two longitudinal members may be parallel to the axis or they may be helicoidally inclined in the same or reverse directions to one another inwardly or outwardly, respectively, so as to form a re-entrant or a salient angle in the sense of their rotary direction.

Taking a mixer of this type the invention consists in mounting on the longitudinal portions of the mixing blade a plurality of annular blades, the centres of which coincide with the axis of rotation of the mixing blade. These blades may be in planes perpendicular to the axis of rotation or they may form helices of small pitch, each blade preferably then forming one turn of the helix. In cross-section the blades may be of the shape of a V or a U, with the narrower part directed inwards.

These additional blades serve to divide the chocolate more efficiently, especially if it is of a heavy pasty nature. They also tend to assist in causing rubbing contact of the chocolate mass upon itself owing to the tendency of the chocolate to adhere to their surfaces as they revolve. This tendency may be increased by undulating the blades on their surfaces or otherwise providing them with protuberances whereby their churning effect on the chocolate mass will be increased in corresponding measure.

In either case the blades sweep the chocolate from side to side in the tank thus producing the required agitation and cause the constant working and rubbing of the particles one over the other whereby a mellow flavour is imparted to the chocolate. The operation is completed in a much shorter time than formerly.

In the accompanying drawings:

Figs. 1, 2 and 3 are respectively a longitudinal section, plan view and transverse section on the line 3—3 of Fig. 1 of the preferred form of apparatus.

In the form of machine shown, the tank $h$ is semi-cylindrical, having its walls extended vertically upwards above the axis to a suitable height. The lower part of said tank $h$ is jacketed at $h^1$ for reception of a tempering medium such as steam.

Journaled in the tank as at $j$, $j^1$ is a mixing blade $k$ comprising a radial arm $k^1$ near one end of the tank, a longitudinal portion $k^2$ extending about half way along the tank near the wall thereof, a substantially diametrical double arm $k^3$ about the middle of the tank, another longitudinal portion $k^4$ extending from the central arm $k^3$ to near the other end of the tank and a radial arm $k^5$ at said other end.

Mounted on the longitudinal portions $k^2$, $k^4$ of the mixing blade $k$ are a plurality of perpendicular annular blades *l* of V section, the centres of which coincide with the axis of rotation of said mixing blade *k*.

The blades *l* perform the function previously described, that is to say, they cause rubbing contact of the chocolate mass upon itself owing to the tendency of the chocolate to adhere to their surfaces as they slide through the mass.

A suitable outlet *m* for the "conched" chocolate may be provided.

What we claim as our invention and desire to secure by Letters Patent of the United States is:—

Apparatus for conching chocolate comprising a tank, a rotor having a sinuous mixing blade extending lengthwise of the tank, and a plurality of annular blades mounted on said mixing blade the surfaces of which are substantially perpendicular to the axis of rotation of the rotor.

In witness whereof we have signed this specification.

WILLIAM EDWARD PRESCOTT.
JOHN PERCIVAL BUNCE.